(12) United States Patent
Otani

(10) Patent No.: US 12,366,588 B2
(45) Date of Patent: Jul. 22, 2025

(54) INERTIAL MEASUREMENT DEVICE AND INERTIAL MEASUREMENT SYSTEM

(71) Applicant: SEIKO EPSON CORPORATION, Tokyo (JP)

(72) Inventor: Fumikazu Otani, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 245 days.

(21) Appl. No.: 18/156,076

(22) Filed: Jan. 18, 2023

(65) Prior Publication Data
US 2023/0228786 A1 Jul. 20, 2023

(30) Foreign Application Priority Data
Jan. 20, 2022 (JP) ................................. 2022-007446

(51) Int. Cl.
*G01P 15/08* (2006.01)
*G01C 19/5776* (2012.01)
(Continued)

(52) U.S. Cl.
CPC .......... *G01P 15/08* (2013.01); *G01C 19/5776* (2013.01); *G01P 3/44* (2013.01);
(Continued)

(58) Field of Classification Search
CPC .......... G01P 15/08; G01P 15/18; G01P 15/02; G01P 3/44; G01P 2015/0862;
(Continued)

(56) References Cited

U.S. PATENT DOCUMENTS 6,023,664 A * 2/2000 Bennet .................... G01P 15/18
73/488
2007/0282553 A1* 12/2007 Fujimoto ............ B60R 21/0132
702/104

(Continued)

FOREIGN PATENT DOCUMENTS

CN 113776522 A 12/2021
JP 2009-31032 A 2/2009

*Primary Examiner* — Helen C Kwok
(74) *Attorney, Agent, or Firm* — Rankin, Hill & Clark LLP

(57) ABSTRACT

An inertial measurement device includes: an inertial sensor; a first signal processing circuit; a second signal processing circuit; a first communication unit and a second communication unit configured to communicate with an external device; and a mode selection unit configured to select a processing mode from a plurality of modes including a first processing mode and a second processing mode. The first processing mode is a mode in which the inertial measurement device is used alone and outputs a signal processed by the first signal processing circuit from the first communication unit, and the second processing mode is a mode in which the inertial measurement device is used in a state of being coupled to another inertial measurement device, a first signal processed by the first signal processing circuit and a second signal from another inertial measurement device received from the second communication unit are subjected to a calculation process by the second signal processing circuit, and a signal subjected to the calculation process is output from the first communication unit.

7 Claims, 11 Drawing Sheets

(51) Int. Cl.
  *G01P 3/44*   (2006.01)
  *G01P 15/02*  (2013.01)
  *G01P 15/18*  (2013.01)

(52) U.S. Cl.
  CPC .............. *G01P 15/02* (2013.01); *G01P 15/18* (2013.01); *G01P 2015/0865* (2013.01)

(58) Field of Classification Search
  CPC ..... G01P 2015/0868; G01P 2015/0865; G01C 19/5776
  See application file for complete search history.

(56) References Cited

U.S. PATENT DOCUMENTS

| | | | |
|---|---|---|---|
| 2012/0017676 A1* | 1/2012 | Schmid | G01C 19/56 73/504.02 |
| 2012/0023354 A1* | 1/2012 | Chino | G01P 15/00 713/323 |
| 2018/0274925 A1* | 9/2018 | Sudo | B60W 40/10 |
| 2019/0285663 A1* | 9/2019 | Chino | G01P 15/18 |
| 2020/0033825 A1 | 1/2020 | Otani et al. | |
| 2021/0389344 A1 | 12/2021 | Hiyoshi | |
| 2022/0308083 A1* | 9/2022 | Otani | G01P 15/08 |
| 2022/0317146 A1* | 10/2022 | Otani | G01P 15/18 |

* cited by examiner

INERTIAL MEASUREMENT DEVICE AND INERTIAL MEASUREMENT SYSTEM

The present application is based on, and claims priority from JP Application Serial Number 2022-007446, filed Jan. 20, 2022, the disclosure of which is hereby incorporated by reference herein in its entirety.

BACKGROUND

1. Technical Field

The present disclosure relates to an inertial measurement device, and an inertial measurement system.

2. Related Art

For example, JP-A-2009-031032 discloses a processing method of an acceleration sensor that electrically adds outputs of a plurality of MEMS acceleration sensors in a stage of a time-series voltage signal. When the number of MEMS acceleration sensors is N, a noise component is reduced to $1/\sqrt{N}$ by the adding, and thus, according to such a processing method, excellent acceleration detection characteristics are obtained.

However, when the outputs of the plurality of MEMS acceleration sensors are obtained by one calculation unit, a large load may be applied to the calculation unit.

SUMMARY

An inertial measurement device according to the present disclosure includes:
an inertial sensor;
a first signal processing circuit configured to process an output signal of the inertial sensor;
a second signal processing circuit configured to process the signal processed by the first signal processing circuit;
a first communication unit and a second communication unit configured to communicate with an external device; and
a mode selection unit configured to select a processing mode from a plurality of modes including a first processing mode and a second processing mode, in which
the first processing mode is a mode in which the inertial measurement device is used alone and outputs the signal processed by the first signal processing circuit from the first communication unit or the second communication unit, and
the second processing mode is a mode in which the inertial measurement device is used in a state of being coupled to another inertial measurement device, a first signal processed by the first signal processing circuit and a second signal from the another inertial measurement device received from one of the first communication unit and the second communication unit are subjected to a calculation process by the second signal processing circuit, and a signal subjected to the calculation process is output from the other one of the first communication unit and the second communication unit.

An inertial measurement system according to the present disclosure includes:
a first inertial measurement device and a second inertial measurement device each including an inertial sensor, a first signal processing circuit configured to processes an output signal of the inertial sensor, a second signal processing circuit configured to process the signal processed by the first signal processing circuit, and a first communication unit and a second communication unit configured to communicate with an external device, in which
the first inertial measurement device and the second inertial measurement device are coupled to each other via one of the first communication unit and the second communication unit,
the second inertial measurement device transmits a second signal processed by the first signal processing circuit of the second inertial measurement device to the first inertial measurement device, and
the first inertial measurement device performs the calculation process on a first signal processed by the first signal processing circuit of the first inertial measurement device and the second signal received from the second inertial measurement device, and outputs a processed signal subjected to the calculation process from the other one of the first communication unit and the second communication unit.

DESCRIPTION OF EXEMPLARY EMBODIMENTS

Hereinafter, an inertial measurement device and an inertial measurement system according to the present disclosure will be described in detail based on embodiments shown in the accompanying drawings.

Figure 1:
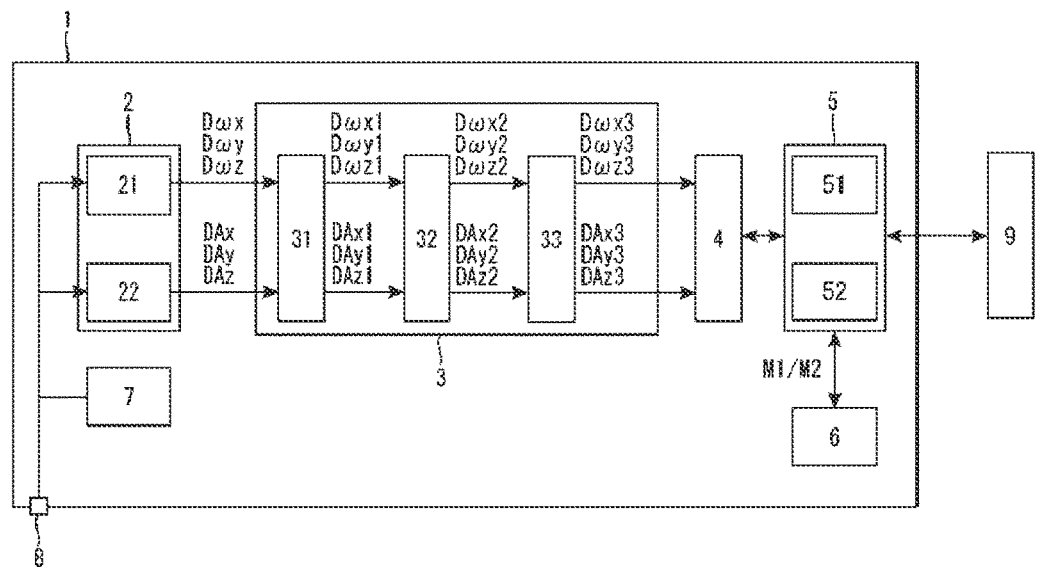
FIG. 1 is a block diagram showing an inertial measurement device according to a first embodiment.
Figure 2:
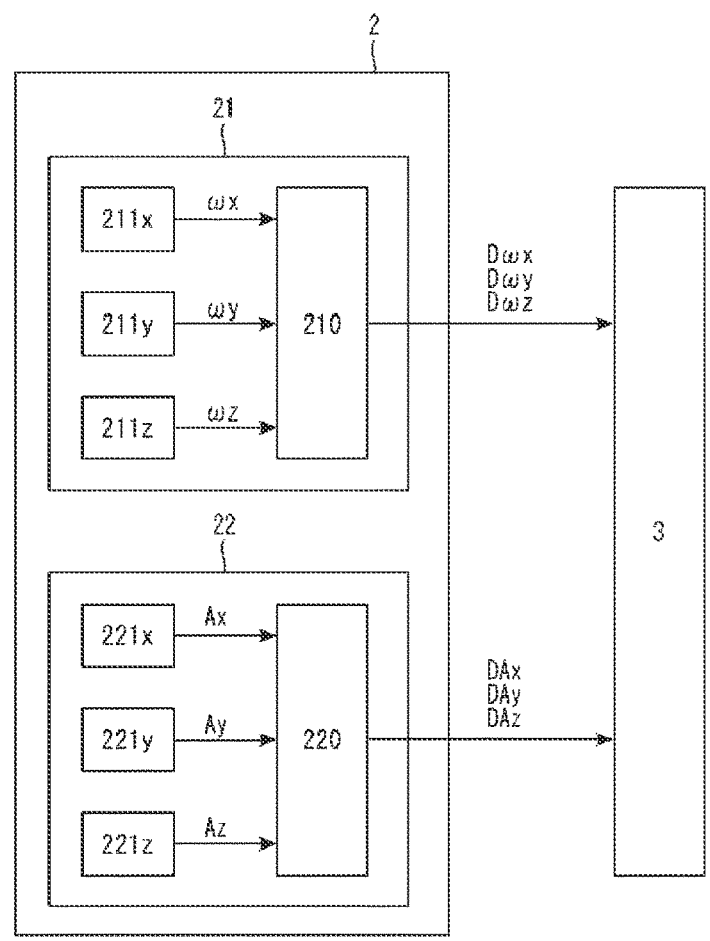
FIG. 2 is a block diagram showing an inertial sensor.
Figure 3:
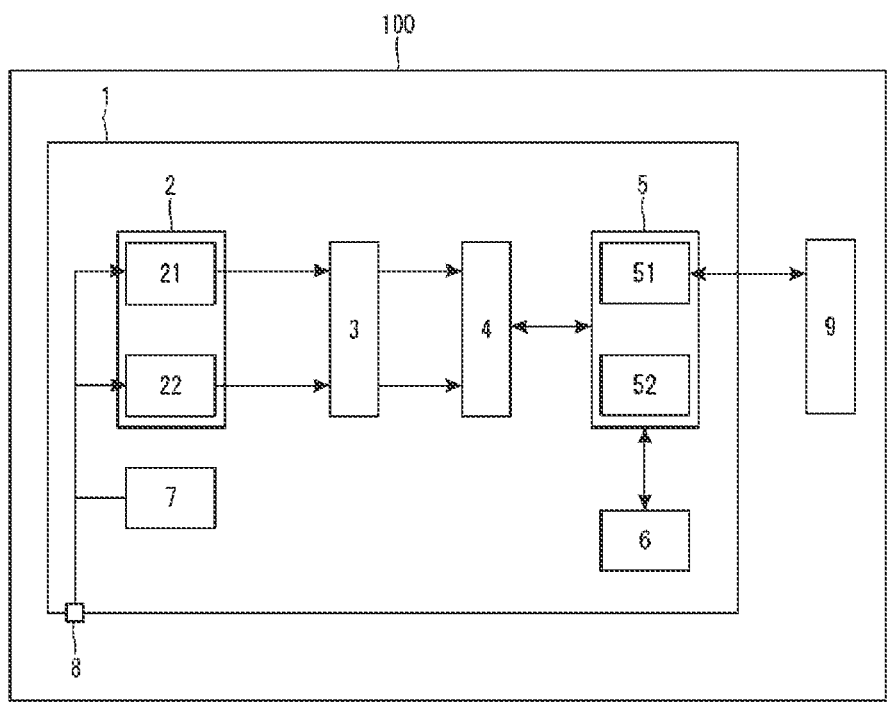
FIG. 3 is a block diagram showing an inertial measurement system to which the inertial measurement device shown in FIG. 1 is applied.
Figure 4:
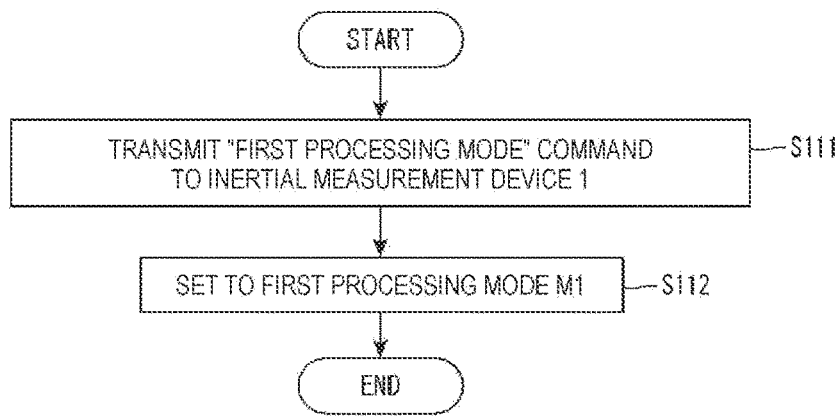
FIG. 4 is a flowchart showing steps of an initialization process.
Figure 5:
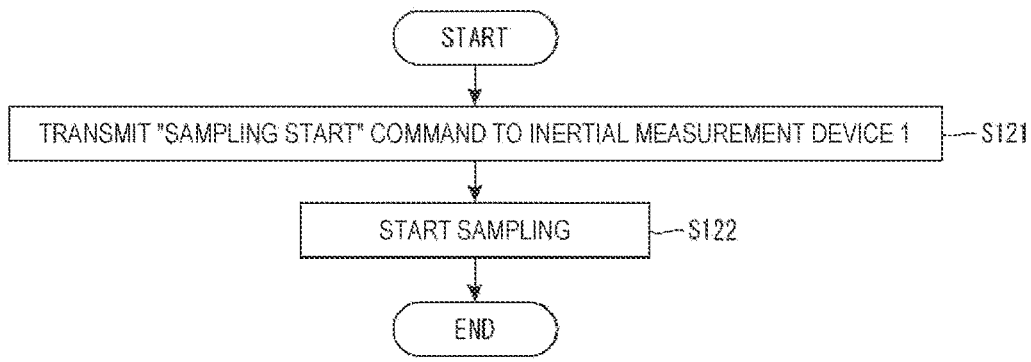
FIG. 5 is a flowchart showing steps of a sampling start process.
Figure 6:
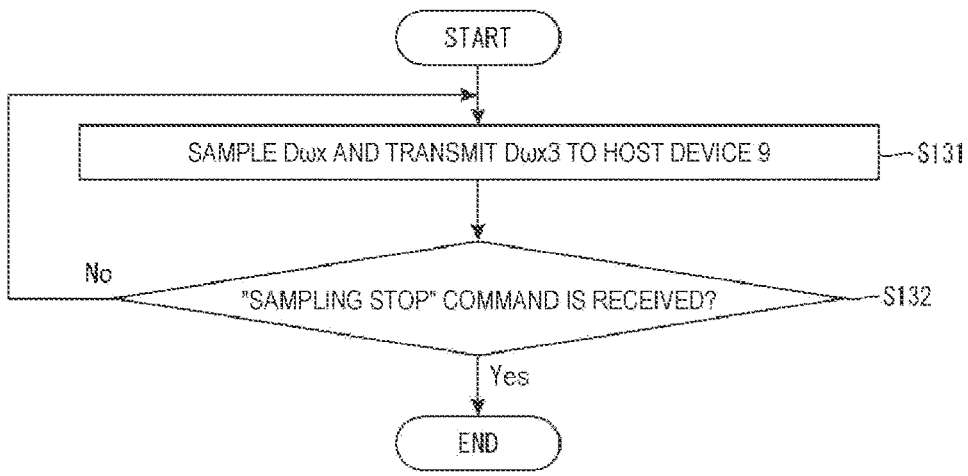
FIG. 6 is a flowchart showing steps of a sampling process.
Figure 7:
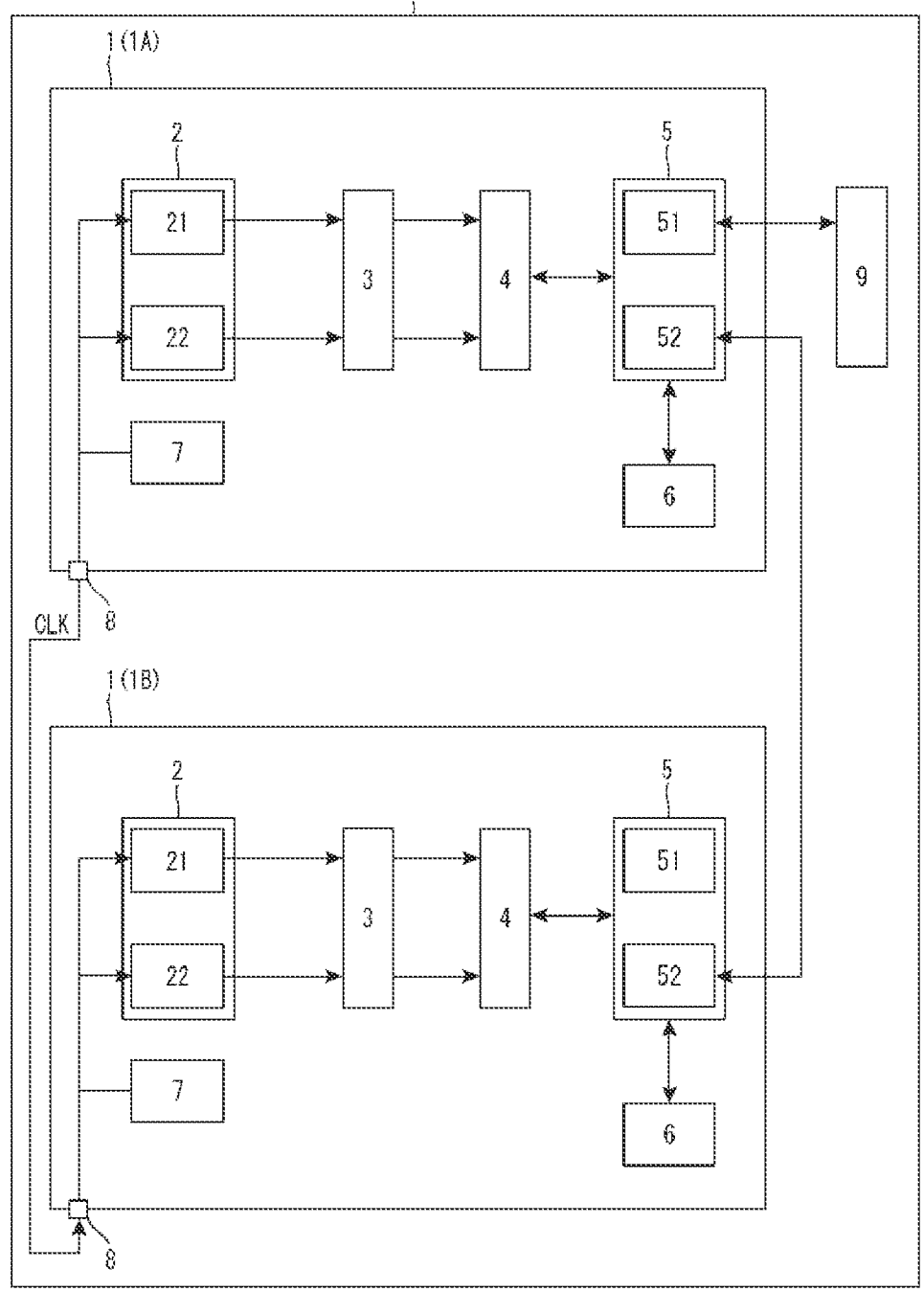
FIG. 7 is a block diagram showing an inertial measurement system to which the inertial measurement device shown in FIG. 1 is applied.
Figure 8:
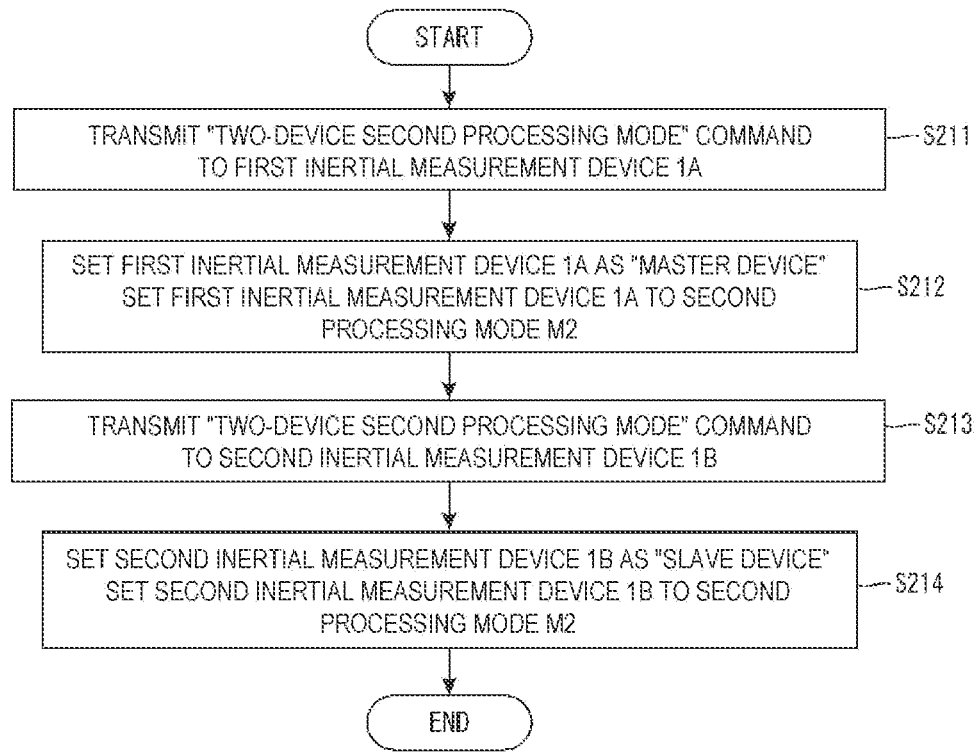
FIG. 8 is a flowchart showing steps of an initialization process.
Figure 9:
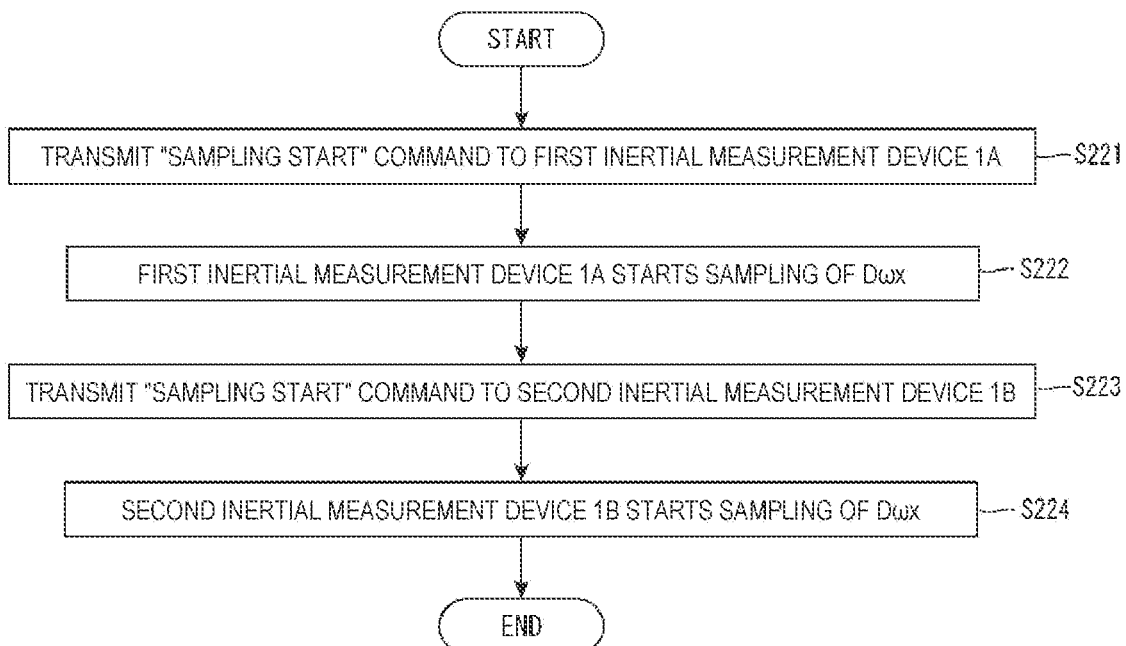
FIG. 9 is a flowchart showing steps of a sampling start process.
Figure 10:
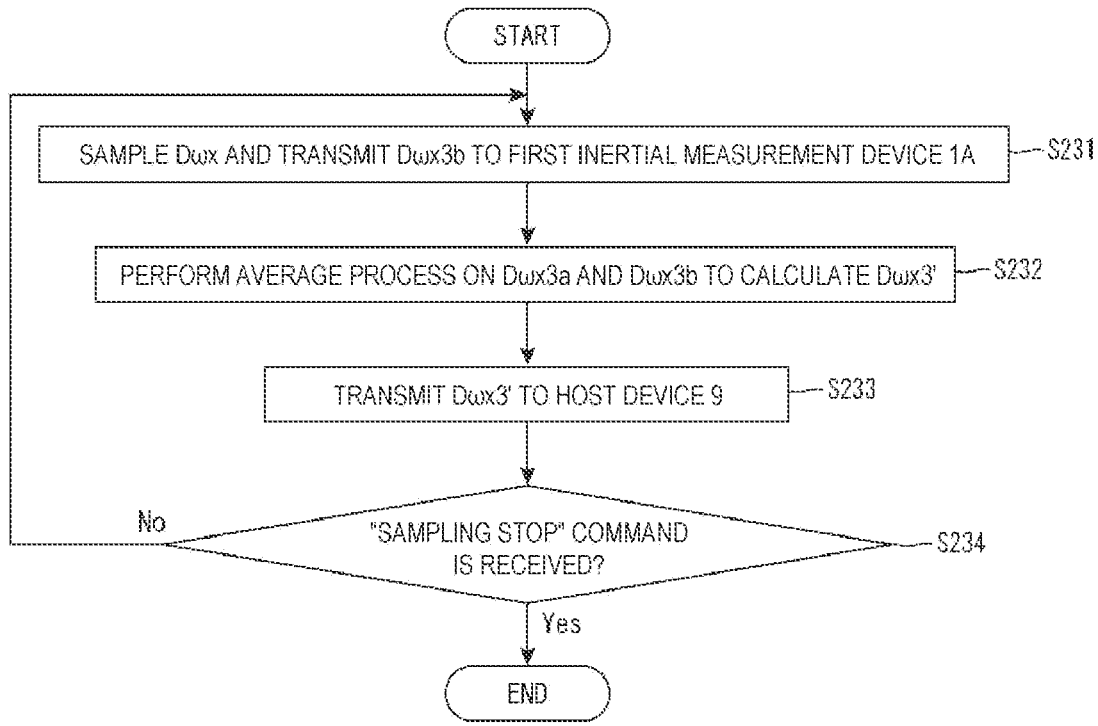
FIG. 10 is a flowchart showing steps of a sampling process.
Figure 11:
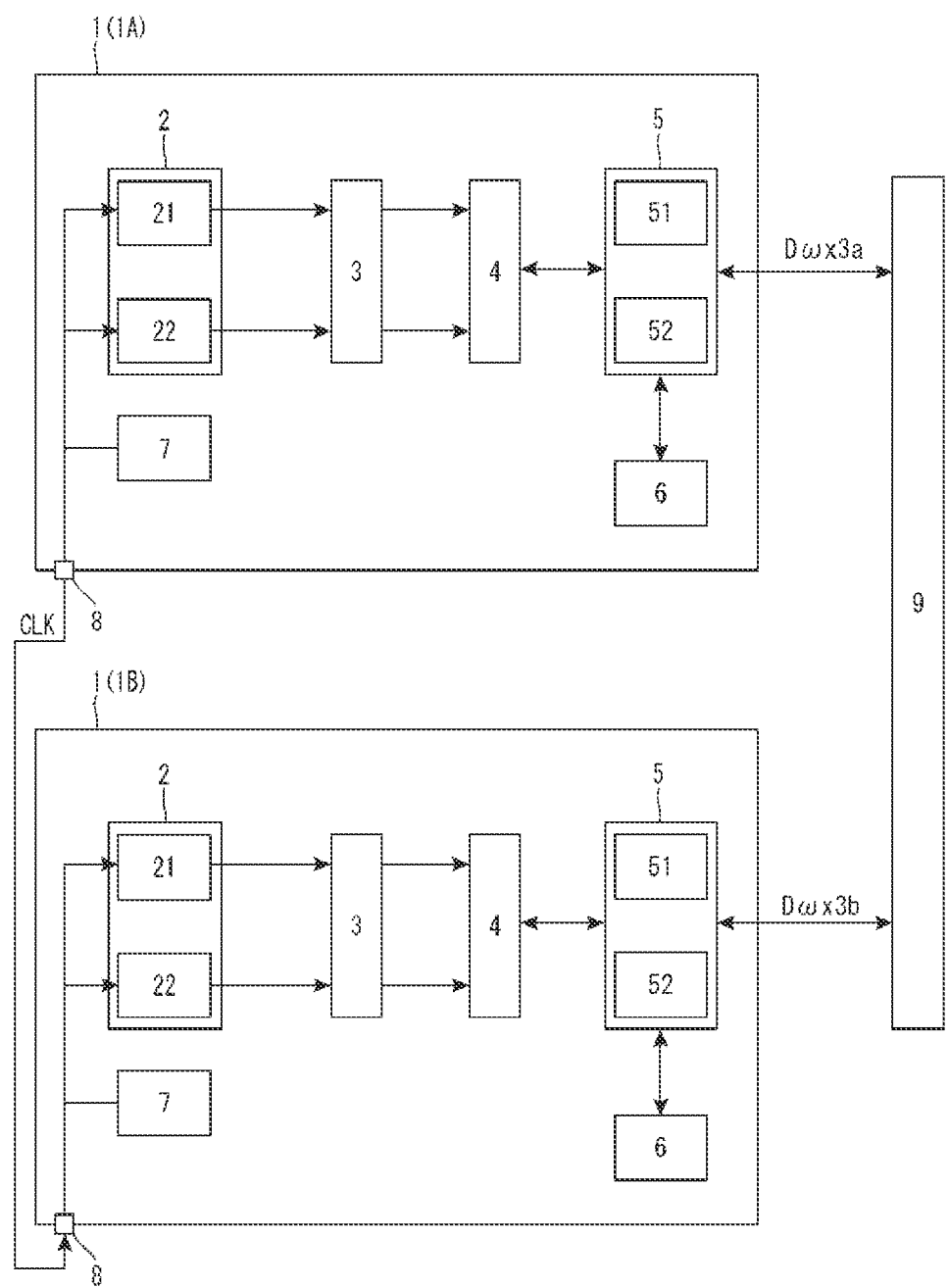
FIG. 11 is a block diagram showing an inertial measurement system in the related art.
Figure 12:
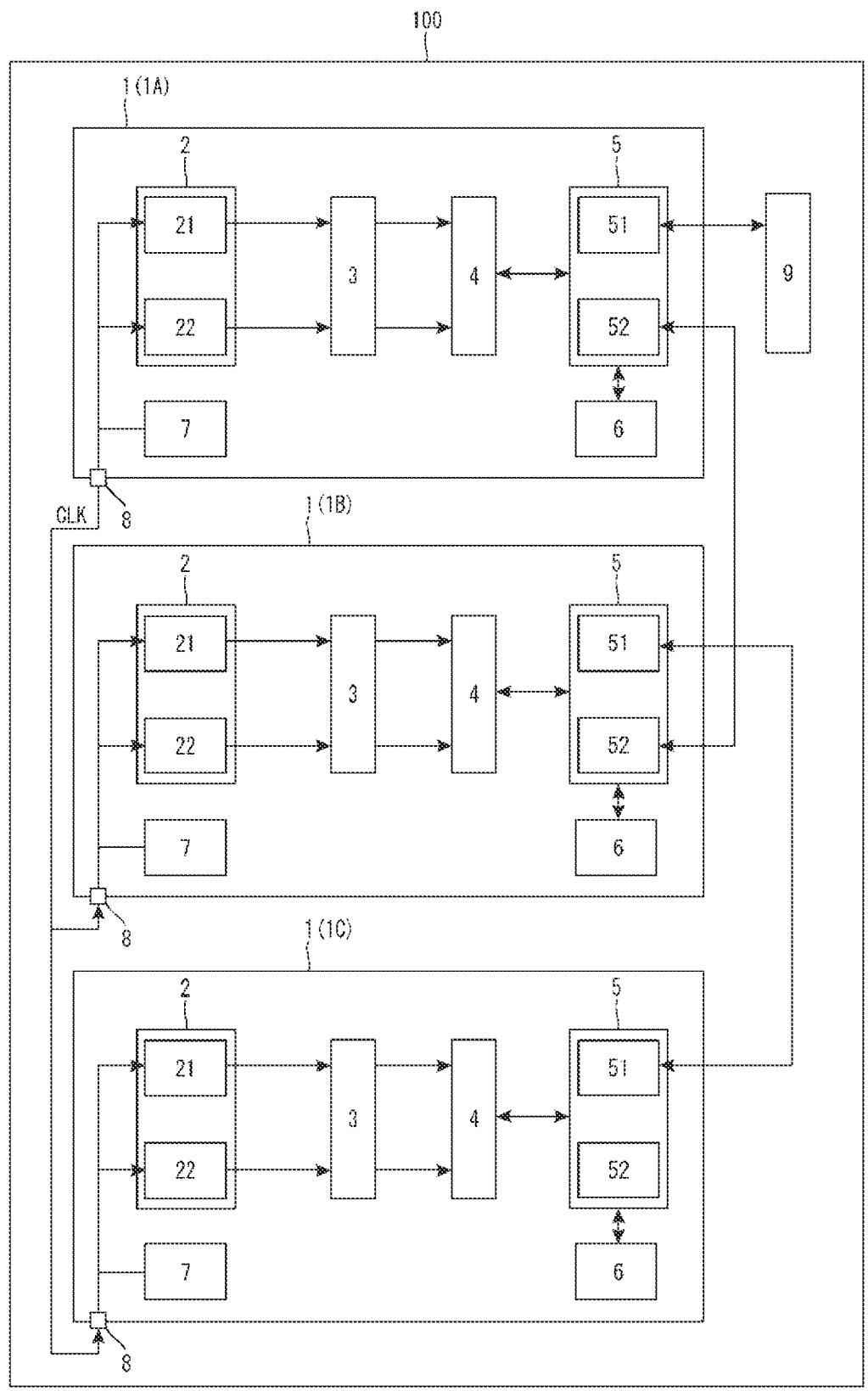
FIG. 12 is a block diagram showing an inertial measurement system to which the inertial measurement device shown in FIG. 1 is applied.
Figure 13:
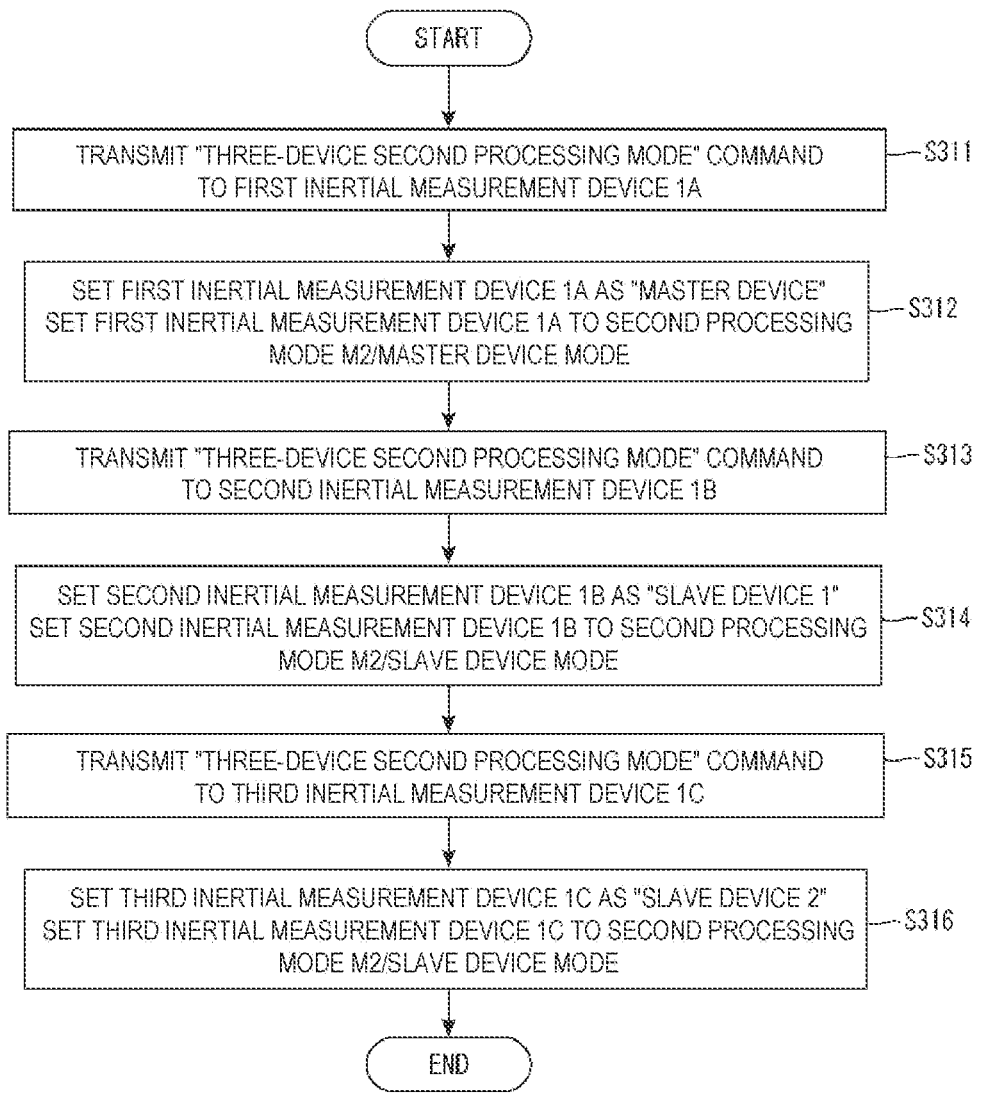
FIG. 13 is a flowchart showing steps of an initialization process.
Figure 14:
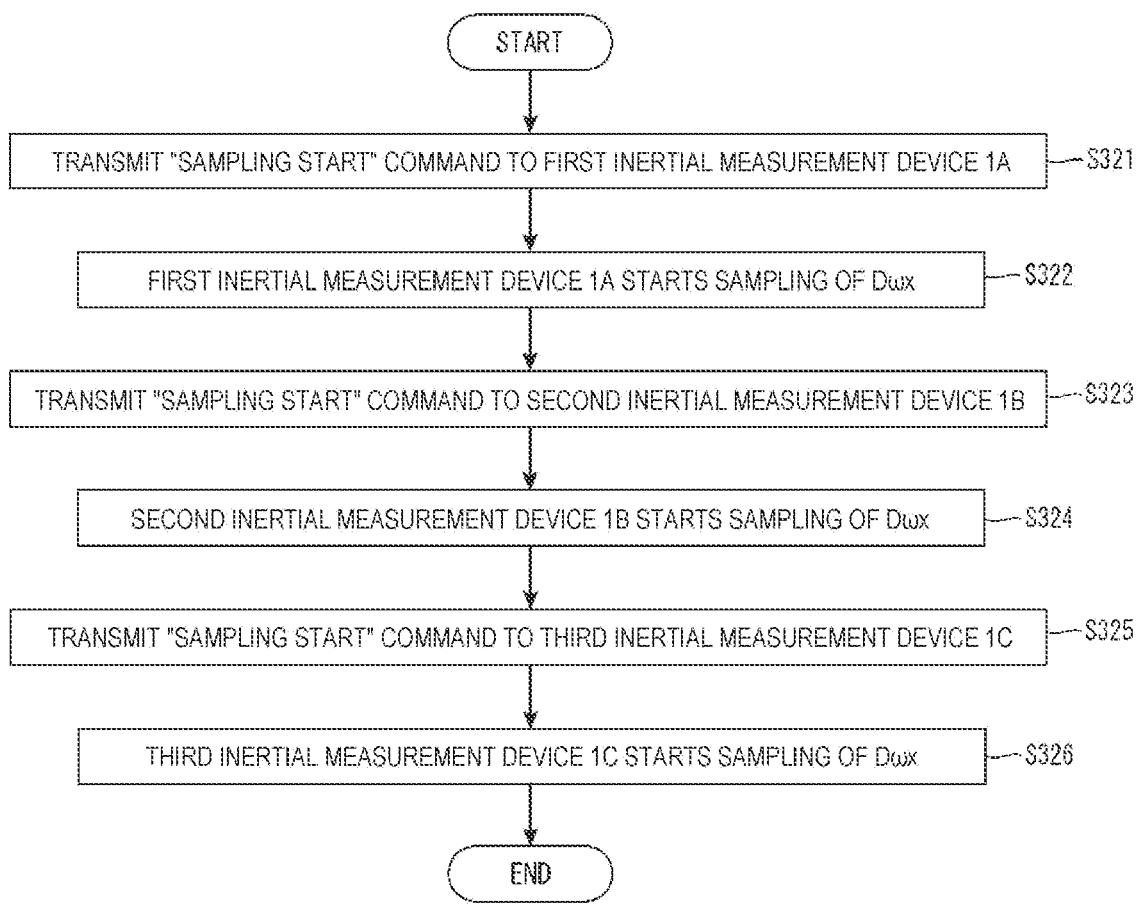
FIG. 14 is a flowchart showing steps of a sampling start process.
Figure 15:
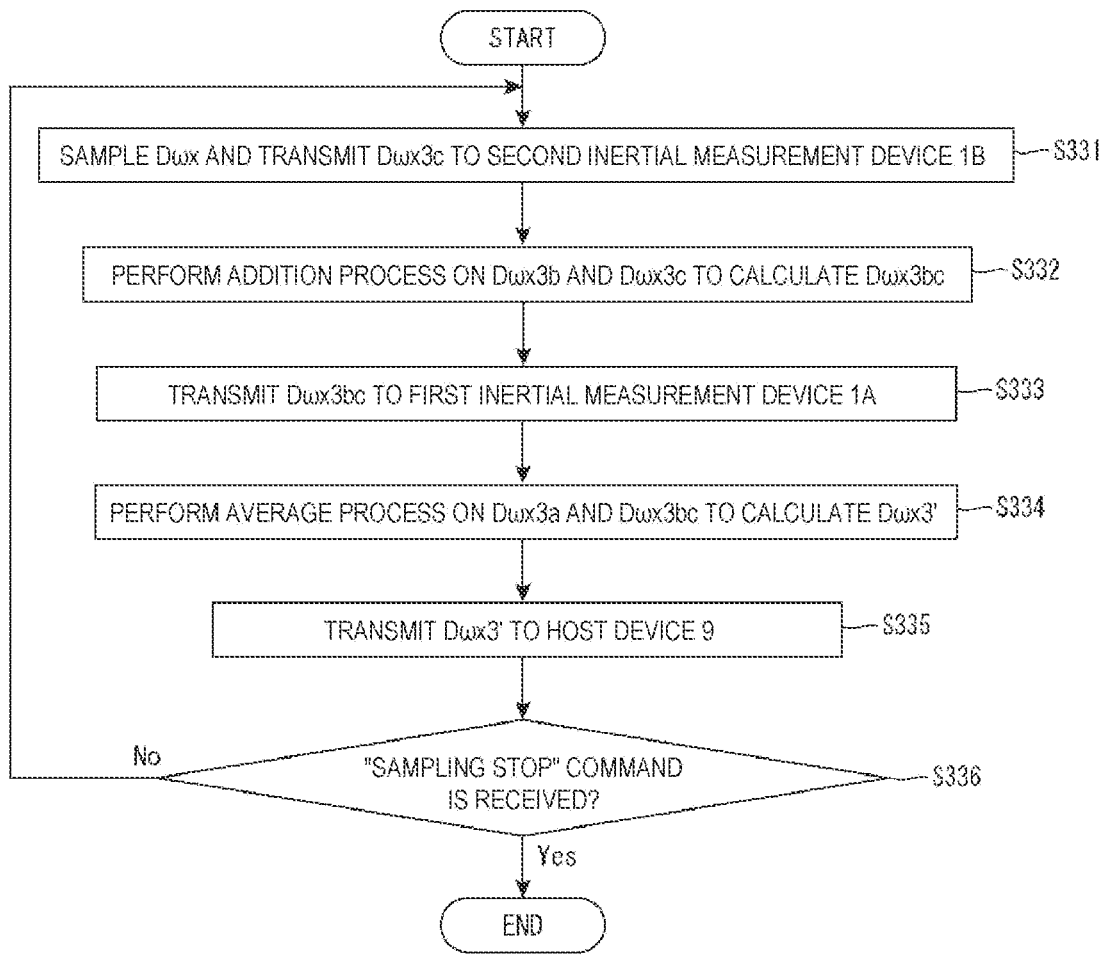
FIG. 15 is a flowchart showing steps of a sampling process.

FIG. 1 is a block diagram showing an inertial measurement device according to a first embodiment. FIG. 2 is a block diagram showing an inertial sensor. FIG. 3 is a block diagram showing an inertial measurement system to which the inertial measurement device shown in FIG. 1 is applied. FIG. 4 is a flowchart showing steps of an initialization process. FIG. 5 is a flowchart showing steps of a sampling start process. FIG. 6 is a flowchart showing steps of a sampling process. FIG. 7 is a block diagram showing an inertial measurement system to which the inertial measurement device shown in FIG. 1 is applied. FIG. 8 is a flowchart showing steps of an initialization process. FIG. 9 is a flowchart showing steps of a sampling start process. FIG. 10 is a flowchart showing steps of a sampling process. FIG. 11 is a block diagram showing an inertial measurement system in the related art. FIG. 12 is a block diagram showing an inertial measurement system to which the inertial measurement device shown in FIG. 1 is applied. FIG. 13 is a flowchart showing steps of an initialization process. FIG. 14 is a flowchart showing steps of a sampling start process. FIG. 15 is a flowchart showing steps of a sampling process.

The inertial measurement device 1 shown in FIG. 1 includes an inertial sensor 2, a first signal processing circuit 3 that processes an output signal of the inertial sensor 2, a second signal processing circuit 4 that processes the signal processed by the first signal processing circuit 3, a host interface 5 that performs communication with the outside, a mode selection unit 6 that selects a measurement mode, an oscillation circuit 7 that generates a synchronization clock CLK, and an input/output terminal 8 that inputs and outputs the synchronization clock CLK.

The inertial sensor 2 includes a triaxial angular velocity sensor 21 and a triaxial acceleration sensor 22.

The triaxial angular velocity sensor 21 independently detects an angular velocity $\omega x$ around an X-axis, an angular velocity $\omega y$ around a Y-axis, and an angular velocity $\omega z$ around a Z-axis, and outputs digital X-axis angular velocity data D$\omega$x, Y-axis angular velocity data D$\omega$y, and Z-axis angular velocity data D$\omega$z.

As shown in FIG. 2, the triaxial angular velocity sensor 21 as described above includes an X-axis angular velocity sensor element 211x that detects the angular velocity $\omega x$ around the X-axis, a Y-axis angular velocity sensor element 211y that detects the angular velocity $\omega y$ around the Y-axis, a Z-axis angular velocity sensor element 211z that detects the angular velocity $\omega z$ around the Z-axis, and a signal processing circuit 210 that processes detection signals from these sensor elements 211x, 211y, and 211z and outputs the data D$\omega$x, D$\omega$y, and D$\omega$z.

Although not shown, the signal processing circuit 210 includes, for example, an analog circuit including an amplifier circuit that amplifies the detection signals from the sensor elements 211x, 211y, and 211z, a synchronous detection circuit that performs synchronous detection on the detection signals, and the like, and an A/D conversion circuit that converts an analog signal from the analog circuit into a digital signal. For example, the A/D conversion circuit performs A/D conversion on an analog signal of the X-axis angular velocity, an analog signal of the Y-axis angular velocity, and an analog signal of the Z-axis angular velocity into digital data in a time division manner.

A configuration of the triaxial angular velocity sensor 21 is not particularly limited as long as the triaxial angular velocity sensor 21 has at least one detection axis.

The triaxial acceleration sensor 22 independently detects an acceleration Ax in an X-axis direction, an acceleration Ay in a Y-axis direction, and an acceleration Az in a Z-axis direction, and outputs digital X-axis acceleration data DAx, Y-axis acceleration data DAy, and Z-axis acceleration data DAz.

As shown in FIG. 2, the triaxial acceleration sensor 22 as described above includes an X-axis acceleration sensor element 221x that detects an acceleration Ax in the X-axis direction, a Y-axis acceleration sensor element 221y that detects an acceleration Ay in the Y-axis direction, a Z-axis acceleration sensor element 221z that detects an acceleration Az in the Z-axis direction, and a signal processing circuit 220 that processes detection signals from these sensor elements 221x, 221y, and 221z and outputs the data DAx, DAy, and DAz.

Although not shown, the signal processing circuit 220 includes, for example, an amplifier circuit that amplifies the detection signals from the sensor elements 221x, 221y, and 221z, an A/D conversion circuit that converts an analog signal from the amplifier circuit into a digital signal, and the like. For example, the A/D conversion circuit performs the A/D conversion on an analog signal of the X-axis acceleration, an analog signal of the Y-axis acceleration, and an analog signal of the Z-axis acceleration into digital data in the time division manner.

A configuration of the triaxial acceleration sensor 22 is not particularly limited as long as the triaxial acceleration sensor 22 has at least one detection axis.

The first signal processing circuit 3 is implemented with, for example, a computer, and includes a processor (CPU) that processes information, a memory communicably coupled to the processor, and an external interface. A program executable by the processor is stored in the memory, and the processor reads and executes the program stored in the memory.

The first signal processing circuit 3 processes the data D$\omega$x, D$\omega$y, D$\omega$z, DAx, DAy, and DAz in the time division manner.

The first signal processing circuit 3 includes three signal processing units 31, 32, and 33 that process the data D$\omega$x, D$\omega$y, D$\omega$z, DAx, DAy, and DAz. The signal processing unit 31 is a filtering circuit that removes noise from the data D$\omega$x, D$\omega$y, D$\omega$z, DAx, DAy, and DAz and outputs data D$\omega$x1, D$\omega$y1, D$\omega$z1, DAx1, DAy1, and DAz1. The signal processing unit 32 is a temperature compensation circuit that performs temperature compensation on the data D$\omega$x1, D$\omega$y1, D$\omega$z1, DAx1, DAy1, and DAz1 and outputs data D$\omega$x2, D$\omega$y2, D$\omega$z2, DAx2, DAy2, and DAz2. The signal processing unit 33 is a matrix calculation circuit that performs matrix calculation for coordinate transformation on the data D$\omega$x2, D$\omega$y2, D$\omega$z2, DAx2, DAy2, and DAz2 and outputs data D$\omega$x3, D$\omega$y3, D$\omega$z3, DAx3, DAy3, and DAz3. The processing contents of the first signal processing circuit 3 are not particularly limited.

The host interface 5 includes a first communication unit 51 and a second communication unit 52. In the present embodiment, the first communication unit 51 communicates with the outside through serial peripheral interface (SPI) communication, and the second communication unit 52 communicates with the outside through universal asynchronous receiver/transmitter (UART) communication. The communication methods of the first communication unit 51 and the second communication unit 52 are not particularly limited.

The mode selection unit 6 selects a processing mode of the inertial measurement device 1. In the present embodiment, the inertial measurement device 1 has a first processing mode M1 and a second processing mode M2 as the processing modes, and the mode selection unit 6 selects the processing mode from the first and second processing modes M1 and M2. The first processing mode M1 is a mode in which one inertial measurement device 1 is used in a state of being coupled to a host device 9, as shown in FIG. 3 to be described later. On the other hand, the second processing mode M2 is a mode in which a plurality of inertial measurement devices 1 are used in the state of being coupled to the host device 9, as shown in FIG. 7 to be described later. Further, the second processing mode M2 has a master device mode in which the inertial measurement device 1 is coupled to the host device 9, and a slave device mode in which the inertial measurement device 1 is coupled to another inertial measurement device 1. These modes will be described later.

The second signal processing circuit 4 is implemented with, for example, a computer, and includes a processor (CPU) that processes information, a memory communicably coupled to the processor, and an external interface. A program executable by the processor is stored in the memory, and the processor reads and executes the program stored in the memory.

In the second processing mode M2, the second signal processing circuit 4 processes the data $D\omega x3$, $D\omega y3$, $D\omega z3$, $DAx3$, $DAy3$, and $DAz3$ in the time division manner. The processing contents of the second signal processing circuit 4 will be described later.

The configuration of the inertial measurement device 1 is described above. Next, an inertial sampling method using the inertial measurement device 1 will be described.

The inertial sampling method includes a first sampling method in which one inertial measurement device 1 is coupled to the host device 9 and a second sampling method in which the plurality of inertial measurement devices 1 are coupled to the host device 9. Since sampling methods of the data $D\omega x$, $D\omega y$, $D\omega z$, $DAx$, $DAy$, and $DAz$ performed in the time division manner are the same as each other, the sampling method of the data $D\omega x$ will be representatively described below for convenience of description, and the sampling methods of other data $D\omega y$, $D\omega z$, $DAx$, $DAy$, and $DAz$ will not be described.

First Sampling Method

In the first sampling method, as shown in FIG. 3, an inertial measurement system 100 is implemented in which one inertial measurement device 1 is coupled to the host device 9 via the host interface 5. In the shown configuration, the inertial measurement device 1 is coupled to the host device 9 via the first communication unit 51, but the present disclosure is not limited thereto, and the inertial measurement device 1 may be coupled to the host device 9 via the second communication unit 52.

Initialization Process

As shown in the flowchart of FIG. 4, first, in step S111, the host device 9 transmits a "first processing mode" command to the inertial measurement device 1 in order to notify the inertial measurement device 1 that sampling is performed in the first processing mode M1. Next, in step S112, the mode selection unit 6 of the inertial measurement device 1 selects the first processing mode M1 as the processing mode. Accordingly, the initialization process ends.

Sampling Start Process

As shown in the flowchart of FIG. 5, first, in step S121, the host device 9 transmits a "sampling start" command to the inertial measurement device 1. Next, in step S122, the inertial measurement device 1 starts sampling of the data $D\omega x$. Accordingly, the sampling start process ends.

Sampling Process

As shown in the flowchart of FIG. 6, first, in step S131, the inertial measurement device 1 samples the data $D\omega x$ and transmits the data $D\omega x3$ obtained by processing the data $D\omega x$ to the host device 9. Such a process of outputting the data $D\omega x3$ corresponds to a process of the first processing mode M1. Next, in step S132, it is determined whether a "sampling stop" command is received from the host device 9. When the "sampling stop" command is not received from the host device 9, the process returns to step S131, and when the "sampling stop" command is received, the sampling ends.

Second Sampling Method (Part 1)

In the second sampling method (Part 1), as shown in FIG. 7, the inertial measurement system 100 is implemented in which two inertial measurement devices, that is, a first inertial measurement device 1A and a second inertial measurement device 1B are coupled in series to the host device 9. Specifically, the first inertial measurement device 1A is coupled to the host device 9 via the first communication unit 51, and the second communication units 52 of the first and second inertial measurement devices 1A and 1B are coupled to each other.

In addition, the input/output terminals 8 of the first and second inertial measurement devices 1A and 1B are coupled to each other, and the synchronization clock CLK generated by the oscillation circuit 7 of the first inertial measurement device 1A is input to the second inertial measurement device 1B. That is, the first inertial measurement device 1A and the second inertial measurement device 1B are synchronized with each other by the synchronization clock CLK generated by the first inertial measurement device 1A. As a result, the first and second inertial measurement devices 1A and 1B can sample the data $D\omega x$ at the same timing, and the angular velocity $\omega x$ can be accurately detected since there is no difference in sampling time.

Initialization Process

As shown in the flowchart of FIG. 8, first, in step S211, the host device 9 transmits a "two-device second processing mode" command to the first inertial measurement device 1A in order to notify the first inertial measurement device 1A that the sampling is performed in the second processing mode M2 using the two inertial measurement devices 1. Next, in step S212, the first inertial measurement device 1A sets itself as a "master device" coupled to the host device 9, and selects the second processing mode M2 as the processing mode. Accordingly, the first inertial measurement device 1A operates in the master device mode of the second processing mode M2.

Next, in step S213, the first inertial measurement device 1A transmits the "two-device second processing mode" command to the second inertial measurement device 1B. Next, in step S214, the second inertial measurement device 1B sets itself as a "slave device" coupled to the first inertial measurement device 1A as the master device, and selects the second processing mode M2 as the processing mode. Accordingly, the second inertial measurement device 1B operates in the slave device mode of the second processing mode M2. Accordingly, the initialization process ends.

Sampling Start Process

As shown in the flowchart of FIG. 9, first, in step S221, the host device 9 transmits the "sampling start" command to the first inertial measurement device 1A. Next, in step S222, the first inertial measurement device 1A starts the sampling of the data $D\omega x$. Next, in step S223, the first inertial measurement device 1A transmits the "sampling start" command to the second inertial measurement device 1B. Next, in step S224, the second inertial measurement device 1B starts the sampling of the data $D\omega x$. Accordingly, the sampling start process ends.

Sampling Process

As shown in the flowchart of FIG. 10, first, in step S231, the second inertial measurement device 1B transmits the data Dωx3 (hereinafter, referred to as "Dωx3b") obtained by processing the sampled data Dωx to the first inertial measurement device 1A as a second signal. Such a process of transmitting the data Dωx3b to the first inertial measurement device 1A as the master device corresponds to a process of the second process mode M2/slave device mode.

Next, in step S232, in the first inertial measurement device 1A, the second signal processing circuit 4 performs an average process on the data Dωx3b as the second signal received from the second inertial measurement device 1B and the data Dωx3 (hereinafter referred to as "Dωx3a") as a first signal generated by the first inertial measurement device 1A by the number of inertial measurement devices 1. Specifically, the second signal processing circuit 4 calculates averaged data Dωx3' by performing a calculation process of (Dωx3a+Dωx3b)/2 using the Dωx3a and Dωx3b sampled at the same time. In this manner, by performing the average process on the two pieces of data Dωx3a and Dωx3b, noise can be reduced. When the number of inertial measurement devices 1 is N, by adding the number of inertial measurement devices 1, a noise component is reduced to $1/\sqrt{N}$.

Next, in step S233, the first inertial measurement device 1A transmits the averaged data Dωx3' to the host device 9. Such a process of calculating and outputting the averaged data Dωx3' corresponds to a process of the second processing mode M2/the master device mode. Next, in step S234, the first inertial measurement device 1A determines whether the "sampling stop" command is received from the host device 9. When the "sampling stop" command is not received from the host device 9, the process returns to step S231, and when the "sampling stop" command is received, the sampling ends.

In the related art, as shown in FIG. 11, the first and second inertial measurement devices 1A and 1B are coupled in parallel to the host device 9, the host device 9 individually receives the data Dωx3a and Dωx3b from the first and second inertial measurement devices 1A and 1B, and performs the average process on the received data Dωx3a and Dωx3b to calculate the averaged data Dωx3'. However, in such a configuration, a communication load and a data processing load (hereinafter, simply referred to as "load") of the host device 9 increase, and the number of signal lines coupled to the host device 9 also increase.

On the other hand, according to the above method, the first inertial measurement device 1A receives the data Dωx3b and calculates the averaged data Dωx3', so that the load of the host device 9 can be reduced. Further, since only the first inertial measurement device 1A as the master device is coupled to the host device 9, it is possible to reduce the number of signal lines coupled to the host device 9.

Second Sampling Method (Part 2)

In the second sampling method (Part 2), as shown in FIG. 12, the inertial measurement system 100 is implemented in which three inertial measurement devices, that is, the first inertial measurement device 1A, the second inertial measurement device 1B and a third inertial measurement device 1C are coupled in series to the host device 9. Specifically, the first inertial measurement device 1A is coupled to the host device 9 via the first communication unit 51, the second communication units 52 of the first and second inertial measurement devices 1A and 1B are coupled to each other, and the first communication units 51 of the second and third inertial measurement devices 1B and 1C are coupled to each other.

Further, the input/output terminal 8 of the first inertial measurement device 1A is coupled to the input/output terminals 8 of the second and third inertial measurement devices 1B and 1C, and the synchronization clock CLK generated by the oscillation circuit 7 of the first inertial measurement device 1A is input to the second and third inertial measurement devices 1B and 1C. That is, the first, second, and third inertial measurement devices 1A, 1B, and 1C are synchronized with one another by the synchronization clock CLK generated by the first inertial measurement device 1A. As a result, the first, second, and third inertial measurement devices 1A, 1B, and 1C can sample the data Dωx at the same timing, and the angular velocity ωx can be accurately detected since there is no difference in sampling time. The second inertial measurement device 1B and the third inertial measurement device 1C include the oscillation circuit 7, but the oscillation circuit 7 may be omitted, or a coupling between the oscillation circuit 7 and the input/output terminal 8 may be switched to be uncoupled according to the processing mode.

Initialization Process

As shown in the flowchart of FIG. 13, first, in step S311, the host device 9 transmits a "three-device second processing mode" command to the first inertial measurement device 1A in order to notify the first inertial measurement device 1A that the sampling is performed in the second processing mode M2 using the three inertial measurement devices 1. Next, in step S312, the first inertial measurement device 1A sets itself as the "master device" coupled to the host device 9, and selects the second processing mode M2 as the processing mode. Accordingly, the first inertial measurement device 1A operates in the master device mode of the second processing mode M2.

Next, in step S313, the first inertial measurement device 1A transmits the "three-device second processing mode" command to the second inertial measurement device 1B. Next, in step S314, the second inertial measurement device 1B sets itself as a "slave device 1" coupled to the first inertial measurement device 1A as the master device, and selects the second processing mode M2 as the processing mode. Accordingly, the second inertial measurement device 1B operates in the slave device mode of the second processing mode M2. Accordingly, the initialization process ends.

Next, in step S315, the second inertial measurement device 1B transmits the "three-device second processing mode" command to the third inertial measurement device 1C. Next, in step S316, the third inertial measurement device 1C is set as a "slave device 2" coupled to the second inertial measurement device 1B as the slave device, and selects the second processing mode M2 as the processing mode. Accordingly, the third inertial measurement device 1C operates in the slave device mode of the second processing mode M2. Accordingly, the initialization process ends.

Sampling Start Process

As shown in the flowchart of FIG. 14, first, in step S321, the host device 9 transmits the "sampling start" command to the first inertial measurement device 1A. Next, in step S322, the first inertial measurement device 1A starts the sampling of the data Dωx. Next, in step S323, the first inertial measurement device 1A transmits the "sampling start" command to the second inertial measurement device 1B. Next, in step S324, the second inertial measurement device 1B starts the sampling of the data Dωx. Next, in step S325, the second inertial measurement device 1B transmits the "sampling start" command to the third inertial measurement device 1C. Next, in step S326, the third inertial measurement device 1C starts the sampling of the data Dωx. Accordingly, the sampling start process ends.

Sampling Process

As shown in the flowchart of FIG. 15, first, in step S331, the third inertial measurement device 1C transmits the data Dωx3 (hereinafter, referred to as "Dωx3c") obtained by processing the sampled data Dωx to the second inertial measurement device 1B as a third signal. In the third inertial measurement device 1C as the slave device at an end, such a process of outputting the data Dωx3c to an upper-level device corresponds to the process of the second process mode M2/the slave device mode. Next, in step S332, in the second inertial measurement device 1B, the second signal processing circuit 4 performs the calculation process on the data Dωx3c received from the third inertial measurement device 1C and the data Dωx3 (hereinafter referred to as "Dωx3b") generated by the second inertial measurement device 1B itself. Specifically, the second signal processing circuit 4 performs an addition process of Dωx3b+Dωx3c using the Dωx3b and Dωx3c sampled at the same time to calculate addition data Dωx3bc as the second signal.

Next, in step S333, the second inertial measurement device 1B transmits the calculated addition data Dωx3bc to the first inertial measurement device 1A. In the second inertial measurement device 1B as the slave device (the slave device that is not a device at the end) including a lower-level slave device, such a process of adding the data Dωx3b and Dωx3c and outputting the calculated addition data to the upper-level device corresponds to the process of the second processing mode M2/slave device mode. Next, in step S334, in the first inertial measurement device 1A, the second signal processing circuit 4 performs the calculation process on the calculated addition data Dωx3bc received from the second inertial measurement device 1B and the data Dωx3a, as the first signal, generated by the first inertial measurement device 1A itself. Specifically, Dωx3bc and Dωx3a sampled at the same time are averaged by the number of inertial measurement devices 1. That is, the averaged data Dωx3' is calculated by performing a calculation process of (Dωx3a+Dωx3bc)/3. In this manner, by performing the average process on the three pieces of data Dωx3a, Dωx3b and Dωx3c, the noise can be reduced.

The inertial measurement system 100 in which three inertial measurement devices 1 are coupled in series to the host device 9 is described above, but N inertial measurement devices 1 may be coupled in series to the host device 9. In this case, N is 3 or more, and in the first inertial measurement device 1A as the master device, the second signal processing circuit 4 averages the data sampled at the same time by N.

Next, in step S335, the first inertial measurement device 1A transmits the averaged data Dωx3' to the host device 9. Such a process of calculating and outputting the averaged data Dωx3' corresponds to a process of the second processing mode M2/the master device mode. Next, in step S336, the first inertial measurement device 1A determines whether the "sampling stop" command is received from the host device 9. When the "sampling stop" command is not received from the host device 9, the process returns to step S331, and when the "sampling stop" command is received, the sampling ends.

In the related art, the first, second, and third inertial measurement devices 1A, 1B, and 1C are coupled in parallel to the host device 9, the host device 9 receives the data Dωx3a, Dωx3b, and Dωx3c from the first, second, and third inertial measurement devices 1A, 1B, and 1C, and performs the average process on the received data Dωx3a, Dωx3b, and Dωx3c to calculate the averaged data Dωx3'. However, in such a configuration, the load of the host device 9 increases, and the number of signal lines coupled to the host device 9 also increase.

On the other hand, according to the above method, the first inertial measurement device 1A receives the data Dωx3b and calculates the averaged data Dωx3', so that the load of the host device 9 can be reduced. Further, since the second inertial measurement device 1B calculates the addition data Dωx3bc by adding the Dωx3b and Dωx3c, the load of the first inertial measurement device 1A is also reduced. In this manner, by distributing the load, the inertial measurement system 100 is constructed in which the load is less likely to be concentrated at one portion. Further, since only the first inertial measurement device 1A as the master device is coupled to the host device 9, it is possible to reduce the number of signal lines coupled to the host device 9.

The inertial measurement device 1 and the inertial measurement system 100 are described above. As described above, such an inertial measurement device 1 includes the inertial sensor 2, the first signal processing circuit 3 that processes the output signal of the inertial sensor 2, the second signal processing circuit 4 that processes the signal processed by the first signal processing circuit 3, the first communication unit 51 and the second communication unit 52 that communicate with an external device, for example, the host device 9 or another inertial measurement device 1, and the mode selection unit 6 that selects the processing mode from the plurality of modes including the first processing mode M1 and the second processing mode M2. The first processing mode is a mode in which the inertial measurement device 1 is used alone and outputs the signal processed by the first signal processing circuit 3 from the first communication unit 51 or the second communication unit 52. The second processing mode M2 is a mode in which the inertial measurement device 1 is used in a state of being coupled to another inertial measurement device 1, the first signal processed by the first signal processing circuit 3 and the second signal from the another inertial measurement device 1 received from one of the first communication unit 51 and the second communication unit 52 are subjected to the calculation process by the second signal processing circuit 4, and the signal subjected to the calculation process is output from the other one of the first communication unit 51 and the second communication unit 52. According to the second processing mode M2, since the inertial measurement device 1 performs the calculation process and outputs the signal, it is possible to reduce the load of a device of an output destination, that is, the host device 9. Further, since only one inertial measurement device 1 is coupled to the host device 9, it is also possible to reduce the number of signal lines coupled to the host device 9.

As described above, in the second processing mode M2, the first signal and the second signal are subjected to the average process as the calculation process. As a result, the noise can be reduced.

As described above, the inertial measurement device 1 includes the oscillation circuit 7 that transmits the synchronization clock CLK, and outputs the synchronization clock CLK to the other inertial measurement device 1. As a result, detection accuracy of inertia is improved.

As described above, the inertial measurement system 100 includes the first inertial measurement device 1A and the second inertial measurement device 1B each including the inertial sensor 2, the first signal processing circuit 3 that processes the output signal of the inertial sensor 2, the second signal processing circuit 4 that processes the signal processed by the first signal processing circuit 3, and the first communication unit 51 and the second communication unit 52 that communicate with an external device, for example, the host device 9 or another inertial measurement device 1. The first inertial measurement device 1A and the second inertial measurement device 1B are coupled to each other via one of the first communication unit 51 and the second communication unit 52. In addition, the second inertial measurement device 1B transmits the data Dωx3b, as the second signal processed by the first signal processing circuit 3 of the second inertial measurement device 1B, to the first inertial measurement device 1A, and the first inertial measurement device 1A performs the calculation process on the data Dωx3a, as the first signal processed by the first signal processing circuit 3 of the first inertial measurement device 1A, and the data Dωx3b received from the second inertial measurement device 1B, and outputs the averaged data Dωx3', as a processed signal subjected to the calculation process, from the other one of the first communication unit 51 and the second communication unit 52. According to such a configuration, since the first inertial measurement device 1A performs the calculation process and outputs the data, it is possible to reduce the load of the device of the output destination, that is, the host device 9. Further, since only one first inertial measurement device 1A is coupled to the host device 9, it is also possible to reduce the number of signal lines coupled to the host device 9.

As described above, the inertial measurement system 100 performs the average process on the data Dωx3a and the data Dωx3b as the calculation process. As a result, the noise can be reduced.

As described above, the inertial measurement system 100 includes the host device 9 which is coupled to the first inertial measurement device 1A and to which the averaged data Dωx3' from the first inertial measurement device 1A is input. As a result, the load of the host device 9 can be reduced.

As described above, the inertial measurement system 100 includes the third inertial measurement device 1C including the inertial sensor 2, the first signal processing circuit 3 that processes the output signal of the inertial sensor 2, the second signal processing circuit 4 that processes the signal processed by the first signal processing circuit 3, and the first communication unit 51 and the second communication unit 52 that communicate with an external device, for example, the host device 9 or another inertial measurement device 1. The second inertial measurement device 1B and the third inertial measurement device 1C are coupled via the other one of the first communication unit 51 and the second communication unit 52, the third inertial measurement device 1C transmits the data Dωx3c, as the third signal processed by the first signal processing circuit 3 of the third inertial measurement device 1C, to the second inertial measurement device 1B, and the second inertial measurement device 1B performs the calculation process on the data Dωx3b, as a signal processed by the first signal processing circuit 3 of the second inertial measurement device 1B, and the data Dωx3c received from the third inertial measurement device 1C, and transmits the addition data Dωx3bc, as a processed signal subjected to the calculation process, to the first inertial measurement device 1A as the second signal. Accordingly, since the calculation process can be further distributed to the first inertial measurement device 1A and the second inertial measurement device 1B, the load of the first inertial measurement device 1A can be reduced.

As mentioned above, although the inertial measurement device and the inertial measurement system according to the present disclosure is described based on illustrated embodiments, the disclosure is not limited thereto. A configuration of each part can be replaced with any configuration having a similar function. Further, any other constituents may be added to the present disclosure. Further, the above-described embodiments may be combined as appropriate.

What is claimed is:

1. An inertial measurement device comprising:
    an inertial sensor;
    a first signal processing circuit configured to process an output signal of the inertial sensor;
    a second signal processing circuit configured to process the output signal processed by the first signal processing circuit;
    a first communication unit and a second communication unit configured to communicate with an external device; and
    a mode selection unit configured to select a processing mode from a plurality of modes including a first processing mode and a second processing mode, wherein
    the first processing mode is a mode in which the inertial measurement device is used alone and outputs the output signal processed by the first signal processing circuit from the first communication unit or the second communication unit, and
    the second processing mode is a mode in which:
        the inertial measurement device is used in a state of being coupled to another inertial measurement device, the another inertial measurement device being identical to the inertial measurement device; and
        a first signal which is the output signal processed by the first signal processing circuit of the inertial measurement device, and a second signal which is the output signal processed by the first signal processing circuit of the another inertial measurement device received from one of the first communication unit and the second communication unit of the another inertial measurement device by a corresponding one of the first communication unit and the second communication unit of the inertial measurement device are subjected to a calculation process by the second signal processing circuit of the inertial measurement device, and a signal subjected to the calculation process is output from the other one of the first communication unit and the second communication unit of the inertial measurement device.

2. The inertial measurement device according to claim 1, wherein
    in the second processing mode, the first signal and the second signal are subjected to an average process as the calculation process.

3. The inertial measurement device according to claim 2, further comprising:
    an oscillation circuit configured to transmit a synchronization clock, wherein
    the synchronization clock is output to the another inertial measurement device.

4. An inertial measurement system comprising:
    a first inertial measurement device and a second inertial measurement device each including an inertial sensor, a first signal processing circuit configured to process an output signal of the inertial sensor, a second signal processing circuit configured to process the output signal processed by the first signal processing circuit of both of the first inertial measurement device and the second inertial measurement device, and a first communication unit and a second communication unit configured to communicate with an external device, wherein the first inertial measurement device and the second inertial measurement device are coupled to each other via one respective ones of the first communication unit and the second communication unit, the second inertial measurement device transmits a second signal which is the output signal of the inertial sensor of the second inertial measurement device processed by the first signal processing circuit of the second inertial measurement device to the first inertial measurement device using the respective ones of the first communication unit and the second communication unit, and the first inertial measurement device performs a calculation process on a first signal which is the output signal of the inertial sensor of the first inertial measurement device processed by the first signal processing circuit of the first inertial measurement device and the second signal received from the second inertial measurement device, and outputs a processed signal subjected to the calculation process from the other one of the first communication unit and the second communication unit.

5. The inertial measurement system according to claim 4, wherein the first signal and the second signal are subjected to an average process as the calculation process.

6. The inertial measurement system according to claim 4, further comprising:

a host device which is coupled to the first inertial measurement device and to which the processed signal from the first inertial measurement device is input.

7. The inertial measurement system according to claim 4, further comprising:

a third inertial measurement device including an inertial sensor, a first signal processing circuit configured to process an output signal of the inertial sensor, a second signal processing circuit configured to process the output signal processed by the first signal processing circuit, and a first communication unit and a second communication unit configured to communicate with an external device, wherein the second inertial measurement device and the third inertial measurement device are coupled to each other via the respective other ones of the first communication unit and the second communication unit, the third inertial measurement device transmits a third signal which is the output signal of the inertial measurement sensor of the third inertial measurement device processed by the first signal processing circuit of the third inertial measurement device to the second inertial measurement device using the respective other ones of the first communication unit and the second communication unit, and the second inertial measurement device performs the calculation process on the output signal of the inertial sensor of the second inertial measurement device processed by the first signal processing circuit of the second inertial measurement device and the third signal received from the third inertial measurement device, and transmits a processed signal subjected to the calculation process to the first inertial measurement device as the second signal using the respective ones of the first communication unit and the second communication unit.

* * * * *